Sept. 18, 1962
P. M. CUPIDO ETAL
3,054,188
LIQUID LEVEL MEASURING APPARATUS
Filed June 23, 1959
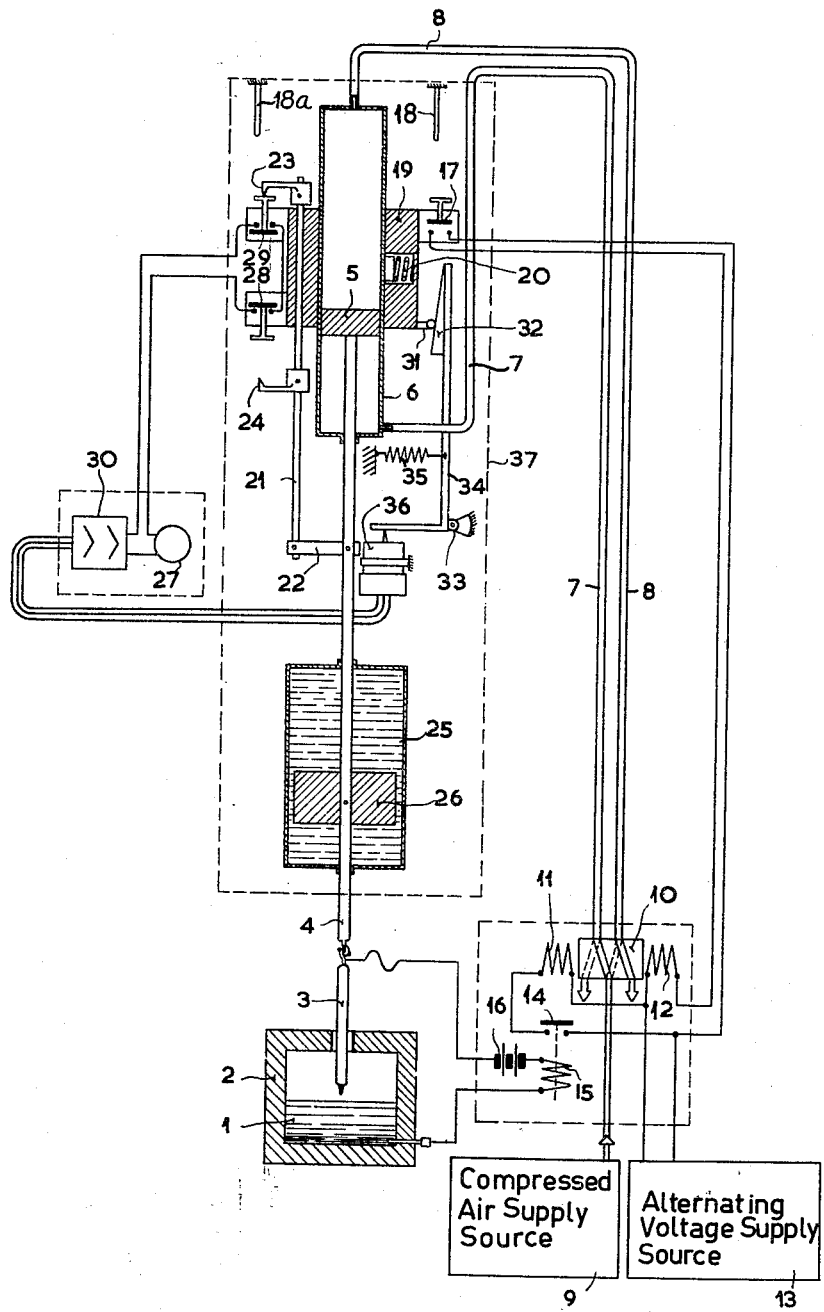
INVENTORS
PIET MARINUS CUPIDO
ANTONIUS MICHIEL JOHANNES MARIA CONIJN
BY
AGENT

United States Patent Office 3,054,188
Patented Sept. 18, 1962

3,054,188
LIQUID LEVEL MEASURING APPARATUS
Piet Marinus Cupido and Antonius Michiel Johannes Maria Conijn, Emmasingel, Eindhoven, Netherlands, assignors to North American Philips Company, Inc., New York, N.Y., a corporation of Delaware
Filed June 23, 1959, Ser. No. 822,274
Claims priority, application Netherlands Aug. 14, 1958
16 Claims. (Cl. 33—126)

The present invention relates to liquid level measuring apparatus. More particularly, the present invention relates to apparatus for measuring the level of an electrically conductive liquid in a container.

Liquid level measuring apparatus of known type is relatively complicated and includes components occupying much space and spaced apart from the liquid.

The principal object of the present invention is the provision of new and improved liquid level measuring apparatus.

An object of the present invention is the provision of new and improved apparatus for measuring the level of molten glass.

Another object of the present invention is the provision of liquid level measuring apparatus of high operating efficiency and relatively simple structure.

Another object of the present invention is the provision of liquid level measuring apparatus of high operating efficiency at relatively high temperatures.

Still another object of the present invention is the provision of liquid level measuring apparatus of relatively compact and lightweight structure.

In accordance with the present invention, a gage rod is supported in a substantially vertical position above the liquid and a piston connected to the gage rod at substantially the upper extremity of the rod is reciprocally movable in a substantially vertical direction in the cylinder. The apparatus of the present invention includes first pressure means for creating a relatively greater pressure in the cylinder below the piston than that above the piston and second pressure means for creating a relatively greater pressure in the cylinder above the piston than that below the piston. The first pressure means for creating a relatively greater pressure in the cylinder below the piston than that above the piston is actuated by electrically energized means. Circuit means including the gage rod and the liquid energizes the electrically energized means upon contact between the rod and the liquid.

In order that the invention may be readily carried into effect, it will now be described with reference to the accompanying drawing, wherein the single FIGURE is a side view, partly in section and partly schematic, of an embodiment of the liquid level measuring apparatus of the present invention.

In the figure, a liquid 1, which may comprise for example, molten glass, is held in a container 2. The container 2 is preferably closed at the top, but has an aperture through its top to permit free passage of a gage rod 3 therethrough. The gage rod is supported in a substantially vertical position above the liquid 1 and may comprise, either entirely or partially, platinum or other suitable electrically conductive material. A connecting bar 4 connects the gage rod 3 at substantially the upper extremity of said gage rod to a piston 5. The piston 5 is reciprocally movable in a substantially vertical direction in a cylinder 6.

The apparatus of the present invention includes means for creating a relatively greater pressure in the cylinder 6 below the piston 5 than that above said piston and means for creating a relatively greater pressure in said cylinder above the said piston than that below the said piston. The means for creating a relatively greater pressure in the cylinder below the piston comprises an air conduit, tube, pipe or hose 7 opening at one end into the lower base area of the cylinder 6. The means for creating a relatively greater pressure in the cylinder above the piston comprises an air conduit, tube, pipe or hose 8 opening at one end into the upper base area of the cylinder 6. Air is admitted to either conduit 7 or 8 under pressure, from a compressed air supply source 9. Of course, any suitable gas under pressure may be utilized to move the piston 5 in the desired manner, air not being necessary as the motive power. The air, or suitable gas, under pressure, is admitted from the source 9 to either conduit 7 or 8 by a control valve 10, which is preferably operable by electrically energized control coils or windings 11 and 12, respectively.

The control coil 11 is energized by an alternating voltage supply source 13 through circuit means connecting said coil, said source and a switch 14 in series circuit arrangement. The switch 14 is normally open and preferably constitutes the armature of a relay having an excitation winding 15. The excitation windng 15 of the relay is energized by a direct voltage supply source 16, which may comprise, for example, a battery through circuit means connecting said winding and said source in series circuit arrangement between the gage rod 3 and the liquid 1. The air gap between the bottom of the gage rod 3 and the surface of the liquid 1 functions as a switch in the relay energizing circuit.

When the bottom of the gage rod 3 contacts the surface of the liquid 1, the relay energizing circuit is closed and the excitation winding 15 of the relay is energized by the voltage source 16. When the excitation winding 15 is energized it attracts the relay armature 14 to close the control coil 11 energizing circuit and the control coil 11 is energized by the voltage source 13. When the control coil 11 is energized, it actuates the control valve 10 to connect the conduit 7 to the air supply source 9 thereby creating a relatively greater pressure in the cylinder 6 below the piston 5 than that above said piston and causing the said piston and the gage rod 3 to move upward in a substantially vertical direction.

The control coil 12 is energized by the alternating voltage supply source 13 through circuit means connecting said coil, said source and a switch arm 17 in series circuit arrangement. The switch arm 17 is normally open and preferably is moved to circuit closing position by a fixed prong or plug 18.

The switch arm 17 is supported by a sliding member 19 which is coaxially positioned on the cylinder 6 and is axially movable on said cylinder. A small amount of friction between the sliding member 19 and the cylinder 6 is obtained by a spring-loaded element 20 which is supported by said sliding member and engages said cylinder. The friction provided by the element 20 prevents the member 19 from moving downward by its own weight.

A control rod 21 is rigidly connected to the connecting bar 4 by a connecting rod 22. The control rod 21 has an upper stop 23 affixed to it substantially at its upper extremity and a lower stop 24 affixed to it substantially at its middle area. When the piston 5 and the connecting bar 4 move downward, the control rod 21 is moved downward and the upper stop 23 of said control rod engages the sliding member 19 and moves it downward. The positioning of the lower stop 24 at a distance from the upper stop 23 greater than the length of the sliding member 19 gives the control rod 21 a free stroke or lost motion, which provides a period of time for measurement of the liquid level after said sliding member reaches its lowermost position and before it is moved upward.

The lowermost position of the sliding member 19 is determined by, and therefore indicative of, the level of the liquid 1 and said sliding member remains in said lowermost position for a period of time, until it is moved upward by the lower stop 24. Since the sliding member 19 remains in the level indicating position for a period of time, any suitable means may be utilized to present a visual measurement of the liquid level.

When the sliding member 19 is moved to its uppermost position, the prong 18 engages the switch arm 17 of the control coil 12 energizing circuit and closes said circuit. When the control coil 12 energizing circuit is closed, said control coil is energized by the voltage source 13. When the control coil 12 is energized, it actuates the control valve 10 to connect the conduit 8 to the air supply source 9 thereby creating a relatively greater pressure in the cylinder 6 above the piston 5 than that below said piston and causing the said piston and the gage rod 3 to move downward in a substantially vertical direction.

The connecting bar 4 preferably passes through suitable damping means to reduce the speed of motion of said bar, the piston 5, the gage rod 3 and the sliding member 19. Suitable damping means may comprise, for example, a substantially vertically positioned cylinder 25 filled with a suitable damping fluid and adapted to pass the connecting bar 4 through said fluid. A damping piston 26 is affixed to the connecting bar 4 to reduce the motion of said bar.

When the sliding member 19 is in its lowermost, or level indicating position, any suitable means may be utilized to present a visual and/or recorded measurement of the liquid level. Suitable recording means may comprise, for example, motor-driven recording means 27 connected in series circuit arrangement with a lower switch arm 28 and an upper switch arm 29, both of which are biased to closed position, supported by the sliding member 19; said series circuit arrangement being connected across the output of amplifier means 30. The circuit of the motor-driven recording means 27 is normally closed but is opened by either of the switch arms 28 and 29, which are maintained open alternately by the stops 23 and 24 when the sliding member 19 is in motion. When the sliding member 19 is moved to its uppermost position, a fixed prong or plug 18a engages the upper switch arm 29 of the recorder circuit and performs the same function as the upper stop 23 does while said sliding member is in downward motion to maintain said recorder circuit open. The circuit of motor driven recorder 27, including switches 28 and 29 is thus closed from substantially the time that sliding member 19 leaves its lowermost, or level indicating position, i.e. when stop 23 has reached the end of its downward movement and has reversed direction and moved upward the slight amount required to let switch arm 29 move into closed position, and until stop 24 contacts switch 28 during its upward movement. Thus, the recording means 27 is energized, and records, only at the proper time.

The circuit of recording means 27 may be rendered operative by any suitable switching means which are closed when the sliding member 19 reaches and remains in its level indicating region. Suitable electric potential for recorder 27 may be provided by any suitable device 36, known per se, and associated mechanism, such as a protrusion 31 affixed to and extending from the sliding member 19 and adapted to move along the edge of a tapered member 32 which is pivotally mounted at a point 33 at the apex of an L-shaped support member 34. The arm of the support member 34 supporting the member 32 is preferably urged against the protrusion 31 by suitable means such as, for example, spring means 35.

When the sliding member 19 moves downward, the protrusion 31 moves along the edge of the member 32 and moves the arm of the support member 34 supporting the member 32 away from said sliding member. The movement of the support member 34 is transmitted by the lower arm of said support member to displacement transducer means 36. The displacement transducer means 36 may comprise any suitable known means for converting a mechanical displacement to a proportional electrical voltage. Suitable displacement transducer means may comprise for example, two coils coupled to a third coil through a movable coupling core. The movable coupling core would be moved by the supporting member 34 in such a manner as to induce a voltage in each of the two coils depending upon the position of said coupling core and therefore the position of said supporting member. The output voltage would be derived from the third coil and would be proportional to the displacement of the tapered member 32. The output voltage of the displacement recording means 36 is applied through the amplifier means 30 to the motor-driven recording means 27 and is compensated in a known suitable manner with an adjustable voltage in the recorder circuit.

Assuming that the piston 5, gage rod 3, connecting bar 4 and sliding member 19 are moving downward; the recorder circuit switch arm 29 is open, the switch armature 14 and the switch arm 17 are open and the protrusion 31 is moving downward along the edge of the member 32. As a result, displacement transducer 26 applies a signal proportioned to displacement to the input of the amplifier 30 in the open circuit of recorder 27 as described above. When gage rod 3 contacts the surface of liquid 1, winding 15 is energized and actuates armature 14 to close the circuit of coil 11. Coil 11, in turn, actuates valve 10 to place conduit 7 in communication with compressed air source 9 whereby piston 5 is urged upwardly, conduit 8 having been opened to atmosphere. As a result, stop 23 has reached its lowermost position and reverses direction leaving sliding member 19 in the level indicating position with the input of the amplifier 30 in the initially open recording circuit supplied with a displacement potential signal and recorder 27 operative as soon as switch 29 is out of contact with stop 23 and for so long as stop 24 has reached switch 28 due to the lost motion arrangement or space between stops 23 and 24. As piston 5 and rod 21 continue their upward movement, stop 24 contacts switch 28 opening the circuit of recorder 27 even while displacement transducer 36 may still be supplying a signal potential to amplifier 30. Thus, recorder 27 is in operation when sliding member 19 reaches level indicating position and continues to operate until stop 24 opens switch 28. As stop 24 opens switch 28 it also simultaneously carries sliding member 19 upwardly along the cylinder 6.

When the sliding member 19 is moved to its uppermost position, the switch arm 17 is closed by the prong 18 to energize the control coil 12 and actuate the control valve 10 to close the conduit 8 to the air supply source 9 thereby creating a relatively greater pressure in the cylinder 6 above the piston 5 than that below said piston and causing the said piston and the gage rod 3 to move downward in a substantially vertical direction.

The gage rod 3 may be suspended from the connecting bar 4 instead of being affixed thereto. The apparatus may be housed in a heat insulated jacket or cover positioned as indicated by the dotted lines 37, if desired.

While the invention has been described by means of a specific example and in a specific embodiment, we do not wish to be limited thereto, for obvious modifications will occur to those skilled in the art without departing from the spirit and scope of the invention.

What we claim is:

1. Apparatus for measuring the level of an electrically conductive liquid in a container, comprising a gage rod supported in a substantially vertical position above said liquid, a cylinder, a piston connected to said gage rod at substantially the upper extremity of the said rod, said piston being reciprocally movable in a substantially vertical direction in said cylinder, first pressure means for creating a relatively greater pressure in said cylinder below said piston than that above the said piston, second pressure means for creating a relatively greater pressure in said cylinder above said piston than that below the said piston, a first electrically energized means for actuating said first pressure means comprising a circuit means, including said gage rod and a connection in continuous contact with said liquid, said circuit closed by contact between the said rod and the said liquid for energizing said first electrically energized means, a second electrically energized means including a second circuit to actuate said second pressure means, lost motion means connected to said piston, said second electrically energized means having circuit elements connected for control by said lost motion means and a liquid level recording means including a circuit also having elements connected for control by said lost motion means whereby a determined period of time is provided for operation of said liquid level recording means.

2. Apparatus for measuring the level of an electrically conductive liquid in a container, comprising a gage rod supported in a substantially vertical position above said liquid, a cylinder, a piston connected to said gage rod at substantially the upper extremity of the said rod, said piston being reciprocally movable in a substantially vertical direction in said cylinder, first pressure means for creating a relatively greater pressure in said cylinder below said piston than that above the said piston, second pressure means for creating a relatively greater pressure in said cylinder above said piston than that below the said piston, a first electrically energized means for actuating said first pressure means, and circuit means, including said gage rod and a connection in continuous contact with the liquid closed by contact between the said rod and the said liquid for energizing said first electrically energized means to actuate said first pressure means, a second electrical energized means for actuating said second pressure means, a liquid level recording means including an associated circuit means, and a lost motion means having connected thereto circuit controlling elements in said liquid level recording circuit means whereby a determined period of time is provided for operation of said liquid level recording means.

3. Apparatus for measuring the level of an electrically conductive liquid in a container comprising a gage rod supported in a substantially vertical position above said liquid, a cylinder, a piston connected to said gage rod at substantially the upper extremity of the said rod, said piston being reciprocally movable in a substantially vertical direction in said cylinder, a sliding member coaxially positioned on said cylinder in a manner whereby said sliding member is substantially vertically displaceable, said sliding member having a lowermost position at which the bottom of said gage rod contacts the said liquid, control means coupling said sliding member to said piston with lost motion whereby motion of the said piston is imparted to the said sliding member after the lapse of a period of time after the said sliding member has reached its lowermost position, first pressure means for creating a relatively greater pressure in said cylinder below said piston than that above the said piston, second pressure means for creating a relatively greater pressure in said cylinder above said piston than that below the said piston, electrically energized means for actuating said first pressure means, and circuit means, including said gage rod and a connection in continuous contact with said liquid, closed by contact between the said rod and the said liquid for energizing said electrically energized means.

4. Apparatus for measuring the level of an electrically conductive liquid in a container comprising a gage rod supported in a substantially vertical position above said liquid, a cylinder, a piston connected to said gage rod at substantially the upper extremity of the said rod, said piston being reciprocally movable in a substantially vertical direction in said cylinder, a sliding member coaxially positioned on said cylinder in a manner whereby said sliding member is substantially vertically displaceable, said sliding member having a lowermost position at which the bottom of said gage rod contacts the said liquid and an uppermost position, control means coupling said sliding member to said piston with lost motion whereby motion of the said piston is imparted to the said sliding member after the lapse of a period of time after the said sliding member has reached its lowermost position, first pressure means for creating a relatively greater pressure in said cylinder below said piston than that above the said piston, second pressure means for creating a relatively greater pressure in said cylinder above said piston that that below the said piston, electrically energized means for actuating said first and second pressure means, first circuit means, including said gage rod and a connection in continuous contact with said liquid, closed by contact between the said rod and the said liquid for energizing said electrically energized means to actuate said first pressure means, and second circuit means closed by said sliding member in its uppermost position for energizing said electrically energized means to actuate said second pressure means.

5. Apparatus for measuring the level of an electrically conductive liquid in a container comprising a gage rod supported in a substantially vertical position above said liquid, a cylinder, a piston connected to said gage rod at substantially the upper extremity of the said rod, said piston being reciprocally movable in a substantially vertical direction in said cylinder, a sliding member coaxially positioned on said cylinder in a manner whereby said sliding member is substantially vertically displaceable, said sliding member having a lowermost position at which the bottom of said gage rod contacts the said liquid, means for imparting a small amount of friction between said sliding member and said cylinder, control means coupling said sliding member to said piston with lost motion whereby motion of the said piston is imparted to the said sliding member after the lapse of a period of time after the said sliding member has reached its lowermost position, first pressure means for creating a relatively greater pressure in said cylinder below said piston than that above the said piston, second pressure means for creating a relatively greater pressure in said cylinder above said piston than that below the said piston, electrically energized means for actuating said first pressure means, and circuit means, including said gage rod and a connection in continuous contact with said liquid, closed by contact between the said rod and the said liquid for energizing said electrically energized means.

6. Apparatus for measuring the level of an electrically conductive liquid in a container comprising a gage rod supported in a substantially vertical position above said liquid, a cylinder, a piston connected to said gage rod at substantially the upper extremity of the said rod, said piston being reciprocally movable in a substantially vertical direction in said cylinder, a sliding member coaxially positioned on said cylinder in a manner whereby said sliding member is substantially vertically displaceable, said sliding member having a lowermost position at which the bottom of said gage rod contacts the said liquid, control means coupling said sliding member to said piston with lost motion whereby motion of the said piston is imparted to the said sliding member after the lapse of a period of time after the said sliding member has reached its lowermost position, recording means, circuit means for said recording means having elements connected for control by said sliding member whereby the period of recording of the level of said liquid is determined by said sliding member, first pressure means for creating a relatively greater pressure in said cylinder below said piston than that above the said piston, second pressure means for creating a relatively greater pressure in said cylinder above said piston than that below the said piston, and electrical means for sequentially actuating said first and second pressure means, including said gage rod and a connection in continuous contact with said liquid.

7. Apparatus for measuring the level of an electrically conductive liquid in a container comprising a gage rod supported in a substantially vertical position above said liquid, a cylinder, a piston connected to said gage rod at substantially the upper extremity of the said rod, said piston being reciprocally movable in a substantially vertical direction in said cylinder, a sliding member coaxially positioned on said cylinder in a manner whereby said sliding member is substantially vertically displaceable, said sliding member having a lowermost position at which the bottom of said gage rod contacts the said liquid, control means coupling said sliding member to said piston with a lost motion whereby motion of the said piston is imparted to the said sliding member after the lapse of a period of time after the said sliding member has reached its lowermost position, recording means, a circuit for said recording means having elements connected for control by said sliding member, a displacement transducer means energizing said circuit comprising means actuated by said sliding member in its lowermost position for converting the displacement of the said sliding member to a proportional electrical voltage whereby the period of operation of the recording means is determined by said sliding member, first pressure means for creating a relatively greater pressure in said cylinder below said piston than that above the said piston, second pressure means for creating a relatively greater pressure in said cylinder above said piston than that below the said piston, and electrical means for sequentially actuating said first and second pressure means, including said gage rod and a connection in continuous contact with said liquid.

8. Apparatus for measuring the level of an electrically conductive liquid in a container comprising a gage rod supported in a substantially vertical position above said liquid, a cylinder, a piston connected to said gage rod at substantially the upper extremity of the said rod, said piston being reciprocally movable in a substantially vertical direction in said cylinder, a sliding member coaxially positioned on said cylinder in a manner whereby said sliding member is substantially vertically displaceable, said sliding member having a lowermost position at which the bottom of said gage rod contacts the said liquid, control means coupling said sliding member to said piston with a lost motion whereby motion of the said piston is imparted to the said sliding member after the lapse of a period of time after the said sliding member has reached its lowermost position, recording means, a voltage generating means comprising means actuated by said sliding member for converting the displacement of the said sliding member to a proportional electrical voltage, circuit means including normally closed switch means movable with said sliding member for applying said last-mentioned voltage to said recording means, stop means actuated by said control means for opening said switch means, first pressure means for creating a relatively greater pressure in said cylinder below said piston than that above the said piston, second pressure means for creating a relatively greater pressure in said cylinder above said piston than that below the said piston, and electrical means for sequentially actuating said first and second pressure means, including said gage rod and a connection in continuous contact with said liquid.

9. Apparatus for measuring the level of an electrically conductive liquid in a container comprising a gage rod supported in a substantially vertical position above said liquid, a cylinder, a piston connected to said gage rod at substantially the upper extremity of the said rod, said piston being reciprocally movable in a substantially vertical direction in said cylinder, a sliding member coaxially positioned on said cylinder in a manner whereby said sliding member is substantially vertically displaceable, said sliding member having a lowermost position at which the bottom of said gage rod contacts the said liquid, control means coupling said sliding member to said piston with lost motion whereby motion of the said piston is imparted to the said sliding member after the lapse of a period of time after the said sliding member has reached its lowermost position, recording means, means actuated by said sliding member in its lowermost position for converting the displacement of the said sliding member to a proportional electrical voltage, said displacement converting means comprising a tapered member having an inclined edge, displacement transducer means, means supporting said tapered member and connected with said displacement transducer means to actuate the said displacement transducer means, a protrusion on said sliding means moving along the edge of said tapered member and circuit means for applying the output voltage of said displacement transducer means to said recording means, normally closed switch means interposed in said voltage applying means and stop means actuated by said control means for opening said switch means, first pressure means for creating a relatively greater pressure in said cylinder below said piston than that above the said piston, second pressure means for creating a relatively greater pressure in said cylinder above said piston than that below the said piston, electrically energized means for actuating said first pressure means, including said gage rod and a connection in continuous contact with said liquid, and circuit means including a switch connected for control by said sliding member for operating said second pressure means.

10. Apparatus for measuring the level of a liquid in a container comprising a gage rod movably supported within said container, means to move said gage rod into and out of contact with said liquid, circuit means to control the movement of said gage rod, lost motion means operatively associated with said means to move the gage rod, liquid level recording means and circuit means to operate said recording means having circuit controlling elements connected to said lost motion means.

11. Apparatus according to claim 10 wherein said circuit means to control the movement of said gage rod includes a switch means connected for control by said lost motion means to control the movement of said means to move said gage rod in at least one direction.

12. Apparatus according to claim 10 with the addition of voltage producing means in the circuit to operate said recording means, and means connected with said lost motion means to control said voltage producing means.

13. Apparatus according to claim 10 wherein said lost motions means including a sliding member and means providing said lost motion to connect said member to said means to move said gage rod, a voltage producing means coupled as an input to the second named circuit means, and means connecting said sliding member to said voltage producing means whereby the voltage produced is proportional to movement of said sliding member.

14. Apparatus according to claim 13 wherein said means providing said lost motion comprises a control rod fixed to said means to move said gage rod, a pair of spaced stop means secured to said control rod, the space between said stop means being greater than the corresponding dimension of said sliding member, said stop means arranged to open said circuit means to operate said recording means when said sliding member is moving.

15. Apparatus according to claim 14 with the addition of further stop means to maintain the last named circuit means open when said sliding member is reposed in a non liquid level indicating position.

16. Apparatus according to claim 14 wherein said means connecting said sliding member to said voltage producing means renders said voltage producing means inoperative when said sliding member is reposed in a non liquid level indicating position.

References Cited in the file of this patent

UNITED STATES PATENTS

| | | |
|---|---|---|
| 951,128 | Johnson | Mar. 8, 1910 |
| 1,664,265 | Rieber | Mar. 27, 1928 |
| 1,917,478 | Whitcomb et al. | July 11, 1933 |